(12) United States Patent
Wang

(10) Patent No.: US 10,110,313 B2
(45) Date of Patent: Oct. 23, 2018

(54) OPTICAL SWITCHING APPARATUS, OPTICAL CROSS-CONNECT NODE, AND OPTICAL SIGNAL SWITCHING METHOD

(71) Applicant: Huawei Technologies Co., Ltd., Shenzhen, Guangdong (CN)

(72) Inventor: Dawei Wang, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/470,633

(22) Filed: Mar. 27, 2017

(65) Prior Publication Data

US 2017/0201324 A1   Jul. 13, 2017

Related U.S. Application Data

(63) Continuation of application No. PCT/CN2014/087659, filed on Sep. 28, 2014.

(51) Int. Cl.
*H04J 14/00* (2006.01)
*H04B 10/50* (2013.01)
(Continued)

(52) U.S. Cl.
CPC ... *H04B 10/5053* (2013.01); *H04B 10/25752* (2013.01); *H04B 10/5161* (2013.01);
(Continued)

(58) Field of Classification Search
CPC .......... H04B 10/5053; H04B 10/25752; H04B 10/5161; H04B 10/532; H04B 10/541;
(Continued)

(56) References Cited

U.S. PATENT DOCUMENTS

2005/0259914 A1* 11/2005 Padgett ................. H01Q 21/26
385/16
2006/0269294 A1   11/2006 Kikuchi
(Continued)

FOREIGN PATENT DOCUMENTS

CN          1571304 A     1/2005
CN          1874199 A    12/2006
(Continued)

OTHER PUBLICATIONS

Tiehui Su et al. "Demonstration of free space coherent optical communication using integrated silicon photonic orbital angular momentum devices", vol. 20, No. 9, Optical Society of America, Apr. 9, 2012.*
(Continued)

*Primary Examiner* — M. R. Sedighian
(74) *Attorney, Agent, or Firm* — Leydig, Voit & Mayer, Ltd.

(57) ABSTRACT

The present invention discloses an optical switching apparatus, an optical cross-connect node, and an optical signal switching method. The optical switching apparatus includes: N input ports, N OAM modulators in a one-to-one correspondence with the N input ports, an OAM splitter, and M output ports, where the M output ports are in a one-to-one correspondence with M OAM modes; a first input port of the input ports is configured to input a first optical signal, a target output port of the first optical signal is a first output port; a first OAM modulator corresponding to the first input port modulates the first optical signal into an optical signal of a first OAM mode corresponding to the first output port; the OAM splitter transmits, to the first output port, the first optical signal received from the first OAM modulator; and the first output port outputs the first optical signal.

14 Claims, 4 Drawing Sheets

(51) Int. Cl.
  *H04B 10/2575* (2013.01)
  *H04B 10/532* (2013.01)
  *H04Q 11/00* (2006.01)
  *H04B 10/556* (2013.01)
  *H04B 10/67* (2013.01)
  *H04B 10/516* (2013.01)
  *H04B 10/54* (2013.01)

(52) U.S. Cl.
  CPC ......... *H04B 10/532* (2013.01); *H04B 10/541* (2013.01); *H04B 10/556* (2013.01); *H04B 10/676* (2013.01); *H04J 14/005* (2013.01); *H04Q 11/0005* (2013.01); *H04Q 2011/002* (2013.01)

(58) Field of Classification Search
  CPC ... H04B 10/556; H04B 10/676; H04J 14/005; H04Q 11/0005; H04Q 2011/002
  USPC .......................................................... 398/50
  See application file for complete search history.

(56) References Cited

U.S. PATENT DOCUMENTS

| | | |
|---|---|---|
| 2007/0065078 A1 | 3/2007 | Jiang |
| 2013/0148963 A1 | 6/2013 | Cvijetic et al. |
| 2015/0117860 A1 | 4/2015 | Braun |
| 2016/0127073 A1 | 5/2016 | Ashrafi et al. |

FOREIGN PATENT DOCUMENTS

| | | |
|---|---|---|
| CN | 102740177 A | 10/2012 |
| WO | 2013160902 A1 | 10/2013 |
| WO | WO 2013164044 A1 | 11/2013 |

OTHER PUBLICATIONS

Su et al., "Demonstration of free space coherent optical communication using integrated silicon photonic orbital angular momentum devices," vol. 20, No. 9, Optical Society of America, (Apr. 9, 2012).

* cited by examiner

OPTICAL SWITCHING APPARATUS, OPTICAL CROSS-CONNECT NODE, AND OPTICAL SIGNAL SWITCHING METHOD

CROSS-REFERENCE TO RELATED APPLICATIONS

This application is a continuation of International Application No. PCT/CN2014/087659, filed on Sep. 28, 2014, the disclosure of which is hereby incorporated by reference in its entirety.

TECHNICAL FIELD

The present invention relates to the field of optical communications, and in particular, to an optical switching apparatus, an optical cross-connect node, and an optical signal switching method in the field of optical communications.

BACKGROUND

With the rapid development of Internet services and multimedia applications, a traffic volume of a network is rapidly expanding at an exponential rate, and therefore the network is required to have a high-bit-rate data transmission capability and a high throughput cross-connect capability. Therefore, a fiber optic communications technology starts to infiltrate a communications network. In addition, because an optical signal of an all optical network (AON) exists always in a form of light instead of undergoing optical-to-electrical conversion and electrical-to-optical conversion when transmitted and switched in the network, there is a tendency for fiber optic communications to develop towards the all optical network in an all-round manner.

An optical cross-connection (OXC) is an important part of the all optical network. Main functions of an OXC node include wavelength dimension switching, spatial dimension switching, local wavelength add/drop, and the like. The network requires the OXC node to be high in a switching capacity, transparent to a wavelength and a data format, low in a congestion rate, low in power consumption, high in an integration level, low in costs, and the like. A key component of the OXC node, that is, an optical switching apparatus, such as an optical switch, is mainly configured to switch an optical signal, that is, output a given quantity of input signals from corresponding output ports according to a given mapping relationship.

Currently, there are mainly two types of optical switching apparatuses applied to a wavelength division multiplexing (WDM) network. One is a 3-dimensional micro-electro-mechanical system (3D-MEMS) optical switch based on a micromirror reflection technology. The optical switch makes input optical signals incident in parallel on an MEMS micromirror array after the input optical signals are collimated by a collimator array. Under control of a control signal, a micromirror of the MEMS micromirror array rotates an orientation and reflects incident light into a corresponding output port, and then focuses the incident light on an output port array by using a converging lens. Therefore, the 3D-MEMS optical switch based on the micromirror reflection technology is a micro mechanical device, susceptible to mechanical vibration, and additional vibration absorbent measures need to be taken to absorb vibration.

The other common optical switching apparatus is an optical switch based on a cross-bar structure. Generally, the optical switch based on the cross-bar structure includes small switch units, and each small switch unit is of a 2×2 structure and has two states: CROSS, output and input being in a cross state (input 1→output 2; and input 2→output 1); and BAR, output and input being in a direct state (input 1→output 1; and input 2→output 2). That is, a 16×16 optical switch needs to be formed by 56 small switch units. Because the cross-bar structure optical switch has many small switch units and has a complex structure, a crosstalk easily occurs between channels. To obtain better switching performance, it is required to add more small switch units or perform algorithm optimization. In addition, the cross-bar structure optical switch easily causes congestion.

Therefore, the existing optical switching apparatus applied to a WDM network either has a congestion problem due to a complex structure, or requires a relatively stable environment. In addition, the existing optical switching apparatus may not be effectively applied to an orbital angular momentum (OAM) network.

SUMMARY

Embodiments of the present invention provide an optical switching apparatus, an optical cross-connect node, and an optical signal switching method, which are applicable to a WDM network or an OAM network, simple in a structure, and free from a congestion problem, and have a low requirement for environmental stability.

According to a first aspect, an optical switching apparatus is provided, including:

N input ports, N orbital angular momentum OAM modulators in a one-to-one correspondence with the N input ports, an OAM splitter, and M output ports connected to the OAM splitter, where N and M are positive integers, and the M output ports are in a one-to-one correspondence with M OAM modes; where a first input port of the N input ports is configured to input a first optical signal, and a target output port of the first optical signal is a first output port of the M output ports;

a first OAM modulator that is of the N OAM modulators and is corresponding to the first input port is configured to modulate the first optical signal into an optical signal of a first OAM mode corresponding to the first output port, where the first optical signal is input from the first input port;

the OAM splitter is configured to transmit the first optical signal to the first output port according to the first OAM mode of the first optical signal modulated by the first OAM modulator, where the first optical signal is received from the first OAM modulator; and the first output port of the M output ports is configured to output the first optical signal transmitted by the OAM splitter.

With reference to the first aspect, in a first possible implementation manner of the first aspect, the OAM splitter includes an OAM demultiplexer, and the OAM demultiplexer is configured to demultiplex an optical signal according to an OAM mode of the optical signal modulated by the N OAM modulators, and transmit the first optical signal in the demultiplexed optical signal to the first output port.

With reference to the first possible implementation manner of the first aspect, in a second possible implementation manner of the first aspect, the optical switching apparatus further includes a converging lens, and the converging lens is configured to converge the optical signal modulated by the N OAM modulators on a focus; and the OAM demultiplexer is located at the focus, and is configured to demultiplex the converged optical signal modulated by the N OAM modulators, and transmit the first optical signal in the demultiplexed optical signal to the first output port.

According to any one of the first aspect or the first and the second possible implementation manners of the first aspect, in a third possible implementation manner of the first aspect, the N OAM modulators include N spatial light modulators SLMs.

With reference to any one of the first aspect or the first to the third possible implementation manners of the first aspect, in a fourth possible implementation manner of the first aspect, when N≥2, a second input port of the N input ports is configured to input a second optical signal, and the second optical signal has no target output port;

a second OAM modulator that is of the N OAM modulators and is corresponding to the second input port is configured to modulate the second optical signal into an optical signal of a second OAM mode different from an OAM mode corresponding to any one of the M output ports, where the second optical signal is input from the second input port; and the OAM splitter is configured to: according to the OAM mode of the optical signal modulated by the N OAM modulators, split the first optical signal from another optical signal having a different OAM mode from the first optical signal, and transmit the first optical signal to the first output port.

With reference to any one of the first aspect or the first to the third possible implementation manners of the first aspect, in a fifth possible implementation manner of the first aspect, when N≥2, M=1, and the M=1 output port is the first output port, a third input port of the N input ports is configured to input a third optical signal, and the third optical signal has no target output port; where a third OAM modulator that is of the N OAM modulators and is corresponding to the third input port is configured to modulate the third optical signal into an optical signal of a third OAM mode whose order is equal to that of an OAM mode corresponding to the M=1 output port and whose sign is opposite to that of the OAM mode corresponding to the M=1 output port, where the third optical signal is input from the third input port; and the OAM splitter is configured to: according to the OAM mode of the optical signal modulated by the N OAM modulators, split the first optical signal from another optical signal having a different OAM mode from the first optical signal, and transmit the first optical signal to the first output port.

According to a second aspect, an optical cross-connect node is provided, where the optical cross-connect node includes: at least one optical switching apparatus according to an embodiment of the present invention, at least one demultiplexer, and at least one multiplexer, where the demultiplexer is configured to demultiplex a received optical signal, so that demultiplexed optical signals are input to J input ports of N input ports of the optical switching apparatus, where N and J are positive integers, and J is less than or equal to N; and the multiplexer is configured to multiplex optical signals output from K output ports of M output ports of the optical switching apparatus, where M and K are positive integers, and K is less than or equal to M.

With reference to the second aspect, in a first possible implementation manner of the second aspect, the optical cross-connect node is applied to a wavelength division multiplexing WDM network, the demultiplexer is a WDM demultiplexer, and the multiplexer is a WDM multiplexer.

With reference to the second aspect, in a second possible implementation manner of the second aspect, the optical cross-connect node is applied to an orbital angular momentum OAM network, the demultiplexer is an OAM demultiplexer, and the multiplexer is an OAM multiplexer.

According to a third aspect, an optical signal switching method is provided, including:

receiving J input optical signals;

determining that a target output port of a first optical signal of the J optical signals is a first output port of M output ports, where the M output ports are in a one-to-one correspondence with M OAM modes;

modulating the first optical signal into an optical signal of a first OAM mode corresponding to the first output port; and outputting the modulated first optical signal from the first output port according to the first OAM mode of the modulated first optical signal, where J and M are positive integers.

With reference to the third aspect, in a first possible implementation manner of the third aspect, when J≥2, and a second optical signal of the J optical signals has no target output port, the method further includes:

modulating the second optical signal into an optical signal of a second OAM mode different from an OAM mode corresponding to any one of the M output ports; and the outputting the modulated first optical signal from the first output port according to the first OAM mode of the modulated first optical signal includes:

according to OAM modes of modulated J optical signals, splitting the first optical signal from another optical signal having a different OAM mode from the first optical signal, and transmitting the first optical signal to the first output port.

With reference to the third aspect, in a second possible implementation manner of the third aspect, when J≥2, M=1, and the M=1 output port is the first output port, a third optical signal of the J optical signals has no target output port, and the method further includes:

modulating the third optical signal into an optical signal of a third OAM mode whose order is equal to that of an OAM mode corresponding to the M=1 output port and whose sign is opposite to that of the OAM mode corresponding to the M=1 output port; and the outputting the modulated first optical signal from the first output port according to the first OAM mode of the modulated first optical signal includes:

according to OAM modes of modulated J optical signals, splitting the first optical signal from another optical signal having a different OAM mode from the first optical signal, and transmitting the first optical signal to the M=1 output port.

Based on the foregoing technical solutions, the optical switching apparatus, the optical cross-connect node, and the optical signal switching method provided in the embodiments of the present invention implement optical signal switching based on an OAM technology, are applicable to a WDM network or an OAM network, simple in a structure, and free from a congestion problem, and have a low requirement for environmental stability.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention.

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that an optical switching apparatus in the embodiments of the present invention may be applied to various optical networks, including a passive optical network (PON for short), such as a gigabit-capable passive optical network ("GPON" for short) system, a 10 Gbit/s Ethernet passive optical network ("10G EPON" for short), or a 10-gigabit-capable passive optical network ("XG PON" for short). In addition, from a perspective of a multiplexing technology, the optical switching apparatus in the embodiments of the present invention may be applied to an OAM network, or may be applied to a non-OAM network, such as a WDM network.

As an independent degree-of-freedom of light, orbital angular momentum (OAM) may be used for information multiplexing, that is, in addition to existing time division multiplexing and wavelength division multiplexing technologies, OAM mode multiplexing may be used to further increase a system capacity. An OAM mode multiplexing technology has much extensive application prospects in the short-range interconnection field, and a principle of the OAM mode multiplexing technology is changing space phase distribution of an optical signal so as to change an OAM mode of the optical signal. Theoretically, any two optical signals of different OAM modes do not interfere with each other, and the OAM modes accord with a linear superposition relationship. In the OAM network, an optical switching architecture having an OAM mode switching function needs to be implemented. In the non-OAM network, optical signal switching may also be performed by using the foregoing features of the OAM mode multiplexing. The optical switching apparatus, an optical cross-connect node, and an optical signal switching method in the embodiments of the present invention are based on the foregoing thought.

Figure 1:
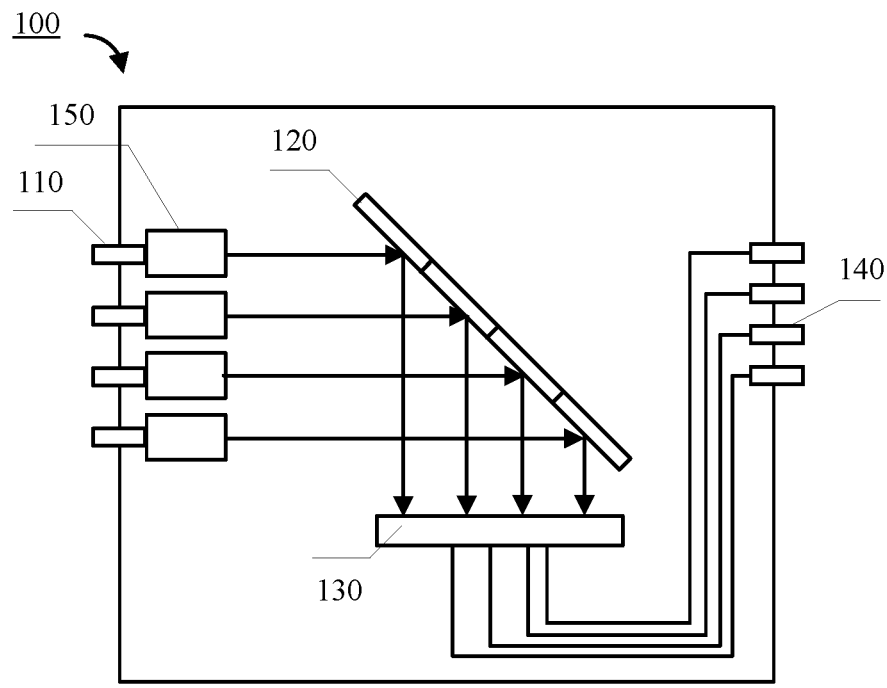
FIG. 1 is a schematic block diagram of an optical switching apparatus according to an embodiment of the present invention.

FIG. 1 shows a schematic block diagram of an optical switching apparatus 100 according to an embodiment of the present invention. As shown in FIG. 1, the optical switching apparatus 100 includes:

N input ports 110, N OAM modulators 120 in a one-to-one correspondence with the N input ports, an OAM splitter 130, and M output ports 140 connected to the OAM splitter 130, where N and M are positive integers, and the M output ports 140 are in a one-to-one correspondence with M OAM modes; where a first input port of the N input ports 110 is configured to input a first optical signal, and a target output port of the first optical signal is a first output port of the M output ports 140;

a first OAM modulator that is of the N OAM modulators 120 and is corresponding to the first input port is configured to modulate the first optical signal into an optical signal of a first OAM mode corresponding to the first output port, where the first optical signal is input from the first input port;

the OAM splitter 130 is configured to transmit the first optical signal to the first output port according to the first OAM mode of the first optical signal modulated by the first OAM modulator, where the first optical signal is received from the first OAM modulator; and the first output port of the M output ports 140 is configured to output the first optical signal transmitted by the OAM splitter.

Specifically, as shown in FIG. 1, the optical switching apparatus 100 may further include N collimators 150 connected to the N input ports 110, and the N collimators 150 are configured to collimate, one by one, optical signals input from the N input ports 110, and make the collimated optical signals incident on the N OAM modulators 120. The collimator is configured to perform collimation and beam expansion on optical signals output from an optical fiber, so that the optical signals output from the optical fiber form parallel light and can propagate farther in free space.

States of the N OAM modulators may be controlled by using control units separately integrated in the OAM modulators 120, or may be controlled by a separate control component, which is not limited in this embodiment of the present invention. Preferably, the N OAM modulators 120 may include N spatial light modulators (SLM). The N SLMs may be N sub-SLM units, or may be N parts of an SLM unit, which is not limited in this embodiment of the present invention. States of the N SLMs may be controlled by using an SLM control unit, and a principle may be changing, based on a liquid crystal on silicon technology, a modulation pattern of the SLM, to modulate space phase distribution of an incident optical signal and therefore change an OAM mode of the optical signal. The SLM control unit controls the modulation pattern of the SLM by using a program, so that a space phase of the incident optical signal is distributed in a spiral pattern, and different space phase changing modes are corresponding to different OAM modes. The SLM control unit may be in a one-to-one correspondence with the SLM, that is, one SLM control unit controls one SLM, or one SLM control unit may control all the N SLMs. In addition, the SLM control unit may be integrated on the SLM, or may be a separate component electrically connected to the SLM by using an electrical wire or the like, which is not limited in this embodiment of the present invention.

It should be understood that the N OAM modulators 120 may also modulate an input optical signal and change an OAM mode of the optical signal based on another technology, such as a thin film hologram technology or a special prism technology, which is not limited in this embodiment of the present invention.

In an embodiment of the present invention, after being switched to the free space through the N input ports 110 and the N collimators 150, the N optical signals from different dimensions are incident in parallel on the N SLMs. According to routing information of an optical cross-connect node, that is, information about which output port each optical signal needs to be finally switched to, the SLM control unit changes a modulation pattern of each of the N SLMs and separately modulates the N parallel incident optical signals into optical signals of corresponding OAM modes. It should be understood that some or all of the N input ports, the N SLMs, and the M output ports in the optical switching apparatus may be used, which is not limited in this embodiment of the present invention.

It should be understood that, in this embodiment of the present invention, the M output ports are in a one-to-one correspondence with the M OAM modes. When more than one optical signal needs to be output, to avoid mutual interference between optical signals, it may be ensured that OAM modes of any two optical signals that need to be output are different from each other. In this case, any two of OAM modes corresponding to more than one output port of the optical switching apparatus 100 are different from each other, that is, the M output ports are respectively corresponding to the M different OAM modes. When a quantity of input optical signals is greater than a quantity of output optical signals, an optical signal that finally needs to be output may be modulated into an optical signal of an OAM mode corresponding to an output port, while another optical signal that does not need to be output may be modulated into an optical signal of another OAM mode whose order is equal to that of the OAM mode of the optical signal that finally needs to be output and whose sign is opposite to that of the OAM mode of the optical signal that finally needs to be output, or may be modulated into an optical signal of another OAM mode different from the OAM mode of the optical signal that finally needs to be output. "OAM modes with equal orders and opposite signs" mentioned herein is a special case for "different OAM modes", which facilitates an operation in an actual implementation process.

After input optical signals are modulated into corresponding OAM modes, the optical signals can be distinguished according to the different OAM modes, so as to split the optical signals of the different OAM modes. The splitting process is implemented by the OAM splitter 130. When N=1, that is, when there is only one optical signal (the first optical signal) input from the input port, according to an OAM mode of the optical signal, the OAM splitter 130 identifies the first optical signal and transmits the first optical signal to the first output port. When N≥2, and there is more than one optical signal input from the input ports, according to OAM modes of the optical signals, the OAM splitter 130 splits the first optical signal from another optical signal having a different OAM mode from the first optical signal, and transmits the first optical signal to the first output port.

Preferably, the OAM splitter 130 may be an OAM demultiplexer, which may receive multiple optical signals (a beam of optical signal) of different OAM modes, split the multiple optical signals (a beam of optical signal), and transmit each demultiplexed optical signal to a corresponding target output port by using an optical fiber. Alternatively, the OAM splitter 130 may include one or more splitting components, and each splitting component separately receives one or more modulated optical signals, and transmits each optical signal to a corresponding target output port. For example, the OAM splitter 130 may include one or more components having splitting and OAM switching functions, which is not limited in this embodiment of the present invention.

In addition, an optical signal obtained after splitting by the OAM splitter 130 may be an optical signal without an OAM mode, or may be an optical signal of an OAM mode that is the same as an OAM mode before the optical signal is modulated by the OAM modulator. The foregoing two cases may be implemented by adjusting a component in the OAM splitter 130, and an OAM mode of an optical signal output from the optical switching apparatus may be adjusted by using a different component, so that the optical signal can be transmitted in a network, which is described in detail in the following.

It should be understood that the OAM modulator and the OAM splitter in this embodiment of the present invention may support multiple OAM modes, and support at least an OAM mode related to the optical switching apparatus in this embodiment of the present invention.

Optionally, the optical signals input from the N input ports 110 are single-wavelength optical signals or single-OAM mode optical signals. In the prior art, generally, for an OXC node of a WDM network, the optical signals input from the N input ports 110 are optical signals that come from different optical fiber dimensions and that have a same wavelength, that is, single-wavelength optical signals; for an OXC node of an OAM network, the optical signals input from the N input ports 110 are optical signals that come from different optical fiber dimensions and that have a same OAM mode, that is, single-OAM mode optical signals. However, the optical signals input from the N input ports 110 may be optical signals with different wavelengths or may be optical signals with different OAM modes, which is not limited in this embodiment of the present invention.

Specifically, for one optical signal that needs to be output, for example, the first optical signal, the first optical signal is input from the first input port of the N input ports 110, and the target output port of the first optical signal is the first output port of the M output ports 140. The first OAM modulator that is of the N OAM modulators 120 and is corresponding to the first input port modulates the first optical signal into the optical signal of the first OAM mode corresponding to the first output port. The OAM splitter 130 transmits the first optical signal to the first output port according to the OAM mode of the optical signal modulated by the OAM modulator, and the first output port outputs the first optical signal from the optical switching apparatus 100.

Therefore, the optical switching apparatus provided in this embodiment of the present invention implements optical signal switching based on an OAM technology, is applicable to a WDM network or an OAM network, simple in a structure, and free from a congestion problem, and has a low requirement for environmental stability.

Figure 2:
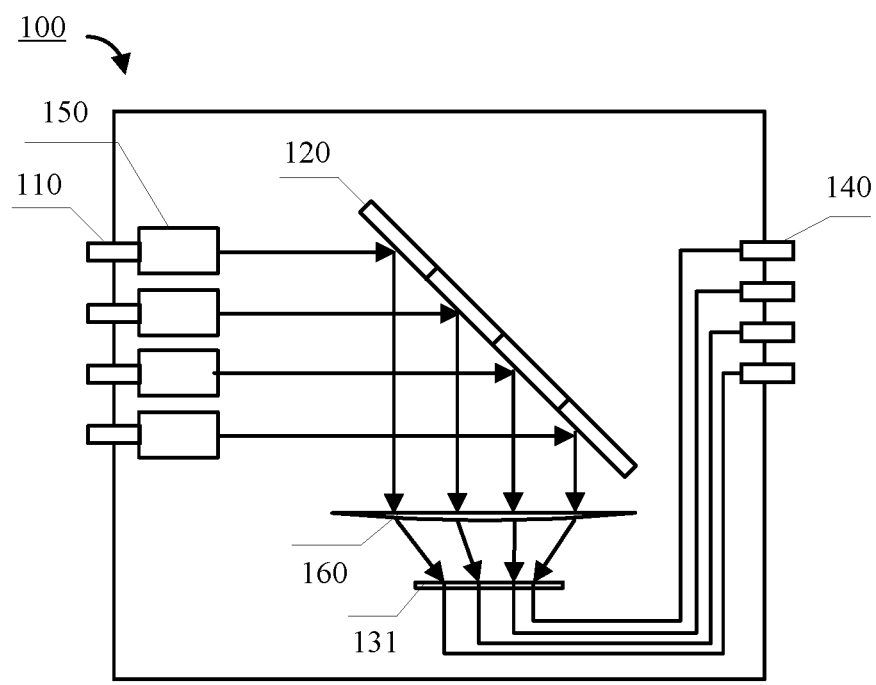
FIG. 2 is a schematic block diagram of an optical switching apparatus according to an embodiment of the present invention.

Preferably, as shown in FIG. 2, the OAM splitter 130 includes an OAM demultiplexer 131, and the OAM demultiplexer 131 is configured to demultiplex an optical signal according to an OAM mode of the optical signal modulated by the N OAM modulators, and transmit the first optical signal in the demultiplexed optical signal to the first output port.

Specifically, the OAM demultiplexer 131 may be implemented by using a silicon-based light field sampling technology, and converts different space phase changes into linear phase changes, so as to split optical signals of different OAM modes. The OAM demultiplexer may be coupled with the output ports by using an optical fiber to further transmit the optical signals to corresponding target output ports.

It should be understood that the optical signal demultiplexed by the OAM demultiplexer 131 may be an optical signal without an OAM mode, or may be an optical signal with an OAM mode (the OAM mode of the optical signal is the same as an OAM mode of an optical signal incident on the OAM demultiplexer 131). In addition, the OAM splitter 130 may include only one OAM demultiplexer, or may further include another component.

When the optical switching apparatus 100 is applied to the WDM network, an optical signal without an OAM mode is input to the optical switching apparatus 100, and preferably should not have an OAM mode either when output from the optical switching apparatus 100. Therefore, it is better to select an OAM demultiplexer whose demultiplexed optical signal does not carry an OAM mode for the OAM splitter 130. If an OAM demultiplexer whose demultiplexed optical signal carries an OAM mode is selected for the OAM splitter 130, an OAM mode cancellation component may be further added after the optical switching apparatus 100, so as to cancel the OAM mode carried by the optical signal.

When the optical switching apparatus 100 is applied to the OAM network, an optical signal with an OAM mode is input to the optical switching apparatus 100, and when the optical signal is output from the optical switching apparatus 100, only routing may be performed on the optical signal, while an OAM mode of each optical signal is unchanged. A combination of an OAM demultiplexer and an OAM mode switching component may be selected for the OAM splitter 130. The OAM demultiplexer may be an OAM demultiplexer whose demultiplexed optical signal does not carry an OAM mode, or may be an OAM demultiplexer whose demultiplexed optical signal carries an OAM mode. The OAM mode switching component may switch an OAM mode of an optical signal to an OAM mode before the optical signal enters the optical switching apparatus 100. Alternatively, a same effect can be achieved by adding an OAM mode switching component after the output ports of the optical switching apparatus 100.

The OAM mode cancellation component and the OAM mode switching component may be based on an SLM technology, which is not limited in this embodiment of the present invention. There are also multiple combination manners of components selected for the OAM splitter 130, which is not limited in this embodiment of the present invention.

Preferably, as shown in FIG. 2, optical signals modulated by the N OAM modulators 120 are distributed in a relatively large area in space, and may be focused on the OAM demultiplexer 131 of relatively small dimensions by using a converging lens. Specifically, the optical switching apparatus 100 further includes a converging lens 160, and the converging lens 160 is configured to converge the optical signal modulated by the N OAM modulators 120 on a focus. The OAM demultiplexer 131 is located at the focus, and is configured to demultiplex the converged optical signal modulated by the N OAM modulators, and transmit the first optical signal in the demultiplexed optical signals to the first output port.

It should be understood that, in the optical switching apparatus 100 in this embodiment of the present invention, when the N OAM modulators 120 are N SLMs and SLM control units, the SLMs and the SLM control units may be integrated together, or may be electrically connected by using an electrical wire, or the like; the OAM demultiplexer 131 may be connected to the M output ports 140 by using an optical fiber; and there is free space between other components, and an optical signal propagates in a refractive or reflective manner. The N collimators 150, the N SLMs, the converging lens 160, and the OAM demultiplexer 131 may be disposed at an angle, so that after being modulated, the incident optical signals from the N input ports 110 may be incident on the OAM demultiplexer 131.

Therefore, the optical switching apparatus provided in this embodiment of the present invention implements optical signal switching based on an OAM technology, is applicable to a WDM network or an OAM network, simple in a structure, and free from a congestion problem, and has a low requirement for environmental stability. In addition, optical signals of different OAM modes can be easily and quickly distinguished by using an OAM demultiplexer, and therefore output from corresponding output ports.

It should be understood that when M≥2, any two of the OAM modes respectively corresponding to the M output ports are different from each other. Specifically, optical signals output from the M output ports 140 are optical signals that need to be output, and to ensure that when optical signal routing is performed in the optical switching apparatus, there is no mutual interference between the optical signals that need to be output, the OAM modes respectively corresponding to the M output ports 140 are set to OAM modes any two of which are different from each other. The following describes several common examples in detail.

In a typical embodiment, as shown in FIG. 2, the optical switching apparatus 100 includes P input ports, from which P optical signals are input, and includes P output ports, from which P optical signals are output. P SLMs modulate each of the P optical signals into an optical signal of an OAM mode corresponding to a target output port of the optical signal. Any two of OAM modes of the P output ports are different from each other, where P is an integer greater than or equal to 2.

To conveniently and clearly describe the technical solution in this embodiment of the present solution, examples in which the optical switching apparatus is applied separately to the WDM network and the OAM network are used for description.

Table 1 shows an input output mapping relationship of a 4×4 optical switching apparatus in a WDM network. That is, an optical signal whose wavelength is $\lambda_1$ and that is input from an input port 1 needs to be switched to and output from an output port 2; an optical signal whose wavelength is $\lambda_2$ and that is input from an input port 2 needs to be switched to and output from an output port 3; an optical signal whose wavelength is $\lambda_3$ and that is input from an input port 3 needs to be switched to and output from an output port 1; and an optical signal whose wavelength is $\lambda_4$ and that is input from an input port 4 needs to be switched to and output from an output port 4. An OAM mode corresponding to the output port 1 is OAM-1, an OAM mode corresponding to the output port 2 is OAM-2, an OAM mode corresponding to the output port 3 is OAM-3, and an OAM mode corresponding to the output port 4 is OAM-4.

For the WDM network, the SLM control unit needs to set a state of a sub-SLM unit corresponding to the input port 1 to OAM-2, set a state of a sub-SLM unit corresponding to the input port 2 to OAM-3, set a state of a sub-SLM unit corresponding to the input port 3 to OAM-1, and set a state of a sub-SLM unit corresponding to the input port 4 to OAM-4. That is, the optical signal whose wavelength is $\lambda_1$ is modulated into an OAM-2 mode, and so on. In this way, no mutual interference is generated between the optical signals of the four OAM modes. The optical signals modulated by the SLMs are incident on the converging lens 160 from the SLMs, are then incident on the OAM demultiplexer 131 after being converged by using the converging lens 160, and are output from corresponding output ports.

TABLE 1

Input output mapping relationship table of an optical switching apparatus in a WDM network

| Input port serial number | WDM wavelength | SLM state | Output port serial number |
|---|---|---|---|
| 1 | $\lambda_1$ | OAM-2 | 2 |
| 2 | $\lambda_2$ | OAM-3 | 3 |
| 3 | $\lambda_3$ | OAM-1 | 1 |
| 4 | $\lambda_4$ | OAM-4 | 4 |

Table 2 shows an input output mapping relationship of a 4×4 optical switching apparatus in an OAM network. That is, an optical signal whose OAM mode is OAM-1 and that is input from an input port 1 needs to be switched to and output from an output port 2; an optical signal whose OAM mode is OAM-2 and that is input from an input port 2 needs to be switched to and output from an output port 3; an optical signal whose OAM mode is OAM-3 and that is input from an input port 3 needs to be switched to and output from an output port 1; and an optical signal whose OAM mode is OAM-4 and that is input from an input port 4 needs to be switched to and output from an output port 4. An OAM mode corresponding to the output port 1 is OAM-1, an OAM mode corresponding to the output port 2 is OAM-2, an OAM mode corresponding to the output port 3 is OAM-3, and an OAM mode corresponding to the output port 4 is OAM-4.

For the OAM network, the optical signals input from the input ports have carried OAM modes. According to an OAM linear superposition principle, for example, OAM-2 can be obtained by superposing OAM-1 on OAM-1, OAM-1 can be obtained by superposing OAM-(−2) on OAM-3, and the like. The SLM control unit needs to set a state of a sub-SLM unit corresponding to the input port 1 to OAM-1, set a state of a sub-SLM unit corresponding to the input port 2 to OAM-1, set a state of a sub-SLM unit corresponding to the input port 3 to OAM-(−2), and set a state of a sub-SLM unit corresponding to the input port 4 to OAM-0, where OAM-0 indicates that the sub-SLM unit does not have any modulation pattern, that is, only reflects the input optical signal without making any change. In this way, no mutual interference is generated between the optical signals of the four OAM modes. The optical signals modulated by the SLMs are incident on the converging lens 160 from the SLMs, are then incident on the OAM demultiplexer 131 after being converged by using the converging lens 160, and are output from corresponding output ports.

TABLE 2

Input output mapping relationship table of an optical switching apparatus in an OAM network

| Input port serial number | OAM mode | SLM state | Output port serial number |
|---|---|---|---|
| 1 | OAM-1 | OAM-1 | 2 |
| 2 | OAM-2 | OAM-1 | 3 |
| 3 | OAM-3 | OAM-(−2) | 1 |
| 4 | OAM-4 | OAM-0 | 4 |

Therefore, the optical switching apparatus provided in this embodiment of the present invention implements optical signal switching based on an OAM technology; is applicable to a WDM network or an OAM network, and simple in a structure; when applied to P×P switching, is free from a congestion problem; and has a low requirement for environmental stability.

Figure 3:
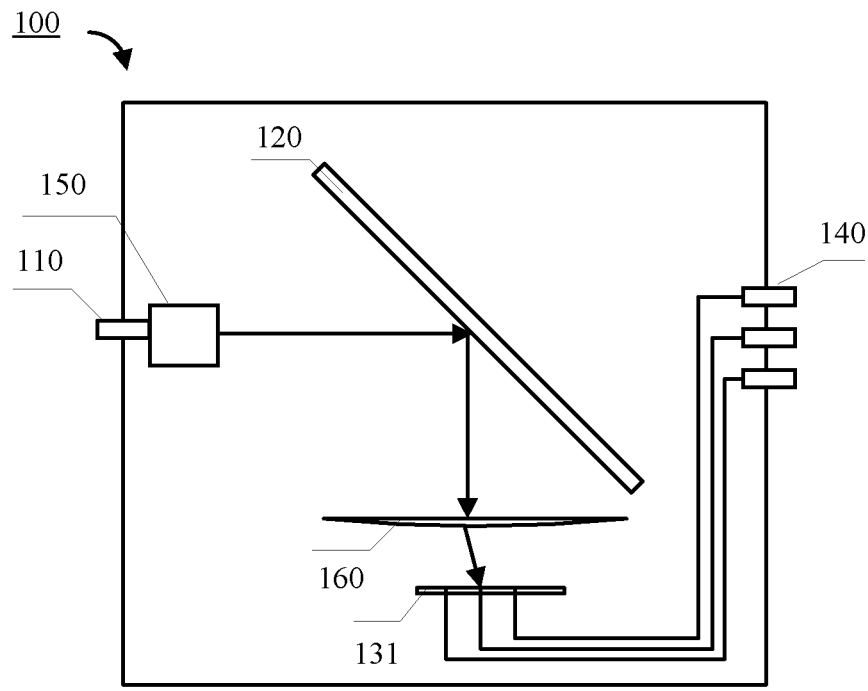
FIG. 3 is a schematic block diagram of an optical switching apparatus according to an embodiment of the present invention.

In another typical example, as shown in FIG. 3, when the optical switching apparatus 100 includes one input port and receives one optical signal, and includes Q output ports and outputs one optical signal from a first output port of the Q output ports, one SLM modulates one optical signal into an optical signal of an OAM mode corresponding to an OAM mode of the first output port, where Q is an integer greater than or equal to 2, any two of OAM modes corresponding to the Q output ports are different from each other.

Specifically, a process in which the optical switching apparatus implements switching from one signal to Q signals is as follows: After being switched to free space through an input port and a collimator, one single-wavelength or single-OAM mode optical signal is incident on an SLM; an SLM control unit changes a modulation pattern of a sub-SLM unit corresponding to the incident optical signal according to routing information of an optical cross-connect node, to modulate a space phase of the incident optical signal and therefore change an OAM mode of the optical signal. The incident optical signal is modulated into an optical signal that is of an OAM mode corresponding to the first output port and that finally needs to be output, the optical signal modulated and reflected by the SLM is focused on the OAM demultiplexer 131 by using the converging lens 160, and the OAM demultiplexer 131 transmits the optical signal to the first output port to output the optical signal from the first output port.

For example, the optical signal input from the input port is an optical signal without an OAM mode, the Q output ports include three output ports: an output port 1, an output port 2, and an output port 3, and OAM modes corresponding to the three output ports are OAM-1, OAM-2, and OAM-3, respectively. The SLM control unit determines, according to the routing information of the optical cross-connect node, that the optical signal input from the input port needs to be output from the output port 2, and therefore the SLM control unit modulates a state of a sub-SLM unit corresponding to the input port into OAM-2. The optical signal modulated and reflected by the SLM is focused on the OAM demultiplexer 131 by using the converging lens 160, and then the OAM demultiplexer 131 transmits the optical signal to the output port 2 to output the optical signal from the output port 2.

For another example, the optical signal input from the input port is an optical signal whose OAM mode is OAM-1, the Q output ports include three output ports: an output port 1, an output port 2, and an output port 3, and OAM modes corresponding to the three output ports are OAM-1, OAM-2, and OAM-3, respectively. The SLM control unit determines, according to the routing information of the optical cross-connect node, that the optical signal input from the input port needs to be output from the output port 3, and therefore the SLM control unit modulates a state of a sub-SLM unit corresponding to the input port into OAM-2. The optical signal modulated and reflected by the SLM is focused on the OAM demultiplexer 131 by using the converging lens 160, and then the OAM demultiplexer 131 transmits the optical signal to the output port 3 to output the optical signal from the output port 3.

Therefore, the optical switching apparatus provided in this embodiment of the present invention implements optical signal switching based on an OAM technology; is applicable to a WDM network or an OAM network and simple in a structure; when applied to 1×Q switching, switches an input optical signal to a corresponding target output port so as to implement optical signal switching; and has a low requirement for environmental stability.

Optionally, in an embodiment, when N≥2, a second input port of the N input ports is configured to input a second optical signal, and the second optical signal has no target output port.

A second OAM modulator that is of the N OAM modulators and is corresponding to the second input port is configured to modulate the second optical signal into an optical signal of a second OAM mode different from an OAM mode corresponding to any one of the M output ports, where the second optical signal is input from the second input port.

The OAM splitter is configured to: according to the OAM mode of the optical signal modulated by the N OAM modulators, split the first optical signal from another optical signal having a different OAM mode from the first optical signal, and transmit the first optical signal to the first output port.

In a typical example, the optical switching apparatus 100 includes E input ports and receives E optical signals, and includes F output ports. E OAM modulators modulate F optical signals of the E optical signals into optical signals of OAM modes in a one-to-one correspondence with OAM modes corresponding to the F output ports, where F is an integer greater than or equal to 2, E is an integer greater than F, and any two of the OAM modes corresponding to the F output ports are different from each other.

For the E×F optical switching apparatus, the F optical signals are selected from the E optical signals and output from F corresponding target output ports. A method is: respectively modulating the F optical signals that need to be output and that are of the E optical signals into optical signals of OAM modes corresponding to target output ports from which the F optical signals should be output, and modulating remaining (E−F) optical signals into optical signals of OAM modes different from the OAM modes of the F optical signals that need to be output. Preferably, in practice, for ease of an operation, the remaining (E−F) optical signals (the second optical signal) are modulated into OAM modes (the second OAM mode) whose orders are equal to those of the OAM modes of the F optical signals that need to be output and whose signs are opposite to those of the OAM modes of the F optical signals that need to be output, that is, the OAM modes of the (E−F) optical signals and an OAM mode of one of the F output ports are equal in orders but opposite in signs; or the OAM modes of the (E−F) optical signals and OAM modes of multiple output ports of the F output ports are equal in orders but opposite in signs, respectively.

The OAM splitter splits, according to an OAM mode of an optical signal modulated by the OAM modulator, a first optical signal from multiple optical signals modulated by the N OAM modulators, that is, splits the first optical signal from another optical signal having a different OAM mode from the first optical signal, and transmits the first optical signal to a first output port.

In a typical example, the optical switching apparatus 100 includes F input ports and receives F optical signals, and includes E output ports. F OAM modulators modulate the F optical signals into optical signals of OAM modes in a one-to-one correspondence with OAM modes corresponding to F output ports of the E output ports, where F is an integer greater than or equal to 2, E is an integer greater than F, and any two of the OAM modes corresponding to the F output ports are different from each other.

For the F×E optical switching apparatus, the F output ports are selected from the E output ports, to output the F optical signals correspondingly. A method is: determining output ports from which the F optical signals need to be respectively output, modulating each of the F optical signals into an optical signal of an OAM mode corresponding to an output port from which the optical signal should be output, and outputting each of the F optical signals from a corresponding target output port.

The OAM splitter splits, according to an OAM mode of an optical signal modulated by the OAM modulator, a first optical signal from multiple optical signals modulated by the N OAM modulators, that is, splits the first optical signal from another optical signal having a different OAM mode from the first optical signal, and transmits the first optical signal to a first output port.

Optionally, in an embodiment, when N≥2, M=1 and the M=1 output port is the first output port, a third input port of the N input ports is configured to input a third optical signal, and the third optical signal has no target output port. A third OAM modulator of the N OAM modulators is configured to modulate the third optical signal into an optical signal of a third OAM mode whose order is equal to that of an OAM mode corresponding to the M=1 output port and whose sign is opposite to that of the OAM mode corresponding to the M=1 output port, where the third optical signal is input from the third output port.

The OAM splitter is configured to: according to the OAM mode of the optical signal modulated by the N OAM modulators, split the first optical signal from another optical signal having a different OAM mode from the first optical signal, and transmit the first optical signal to the first output port.

Figure 4:
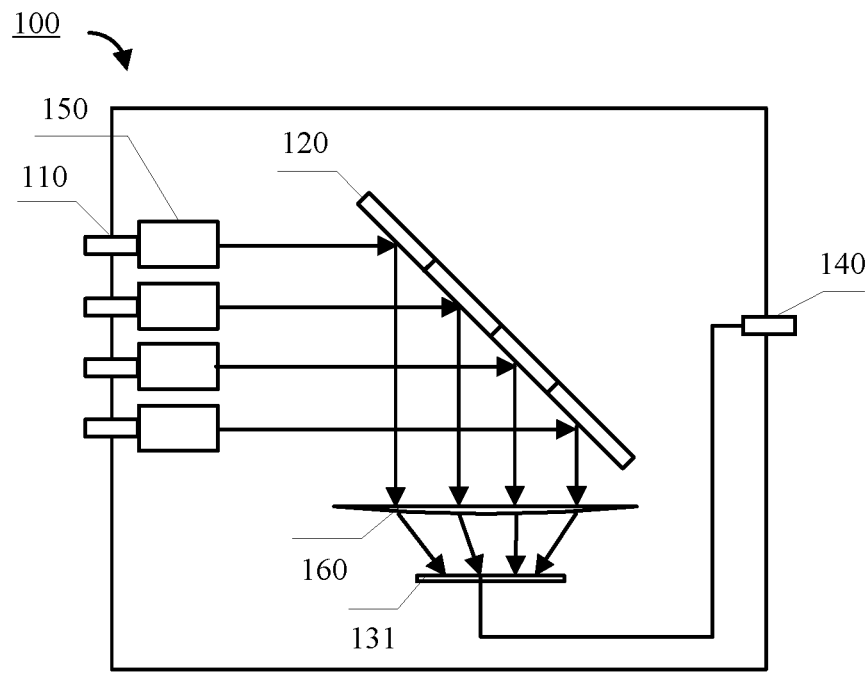
FIG. 4 is a schematic block diagram of an optical switching apparatus according to an embodiment of the present invention.

In a typical example, as shown in FIG. 4, the optical switching apparatus 100 includes H input ports and receives H optical signals, and includes one output port and outputs one optical signal, that is, a first optical signal. H OAM modulators modulate the first optical signal into an optical signal of a first OAM mode corresponding to the one output port, and modulate another optical signal, for example, a third optical signal, except the first optical signal in the H optical signals into an optical signal of an OAM mode whose order is equal to that of the OAM mode of the first optical signal and whose sign is opposite to that of the OAM mode of the first optical signal, where H is an integer greater than or equal to 2.

Specifically, a process in which the optical switching apparatus implements switching from H signals to one signal is as follows: After being switched to free space through input ports and collimators, H single-wavelength or single-OAM mode (this embodiment of the present invention is not limited thereto) optical signals are incident on H SLMs; an SLM control unit changes, according to routing information of an optical cross-connect node, modulation patterns of sub-SLM units respectively corresponding to the H incident optical signals, to modulate space phase distribution of the H incident optical signals and therefore change OAM modes of the optical signals. One optical signal that needs to be output and that is of the H incident optical signals, for example, the first optical signal, is modulated into an optical signal of an OAM mode corresponding to the one output port. Another optical signal except the first optical signal in the H optical signals is modulated into an optical signal of an OAM mode whose order is equal to that of the OAM mode of the first optical signal and whose sign is opposite to that of the OAM mode of the first optical signal. The H optical signals modulated and reflected by the H SLMs are focused on the OAM demultiplexer 131 by using the converging lens 160, and after being demultiplexed by the OAM demultiplexer 131, the first optical signal is transmitted to the output port.

For example, four optical signals input from the input ports are optical signals without OAM modes, and are incident from an input port 1, an input port 2, an input port 3, and an input port 4, respectively. The OAM mode corresponding to the output port is OAM-1. The SLM control unit determines, according to the routing information of the optical cross-connect node, that an optical signal input from the input port 2 needs to be output from the output port, and therefore the SLM control unit modulates a state of a sub-SLM unit corresponding to the input port 2 into OAM-1, and modulates sub-SLM units corresponding to the input port 1, the input port 3, and the input port 4 into a state of OAM-(−1). The optical signal incident from the input port 2 is modulated into an OAM-1 mode, and optical signals incident from other input ports are modulated into an OAM-(−1) mode. These optical signals are focused on the OAM demultiplexer 131 by using the converging lens 160, and then the OAM demultiplexer 131 transmits the optical signal of the OAM-1 mode to the output port to output the optical signal from the output port.

For another example, four optical signals are input from an input port 1, an input port 2, an input port 3, and an input port 4, and OAM modes of all the four optical signals are OAM-1. The OAM mode corresponding to the one output port is OAM-3. The SLM control unit determines, according to the routing information of the optical cross-connect node, that an optical signal input from the input port 2 needs to be output from the output port, and therefore the SLM control unit modulates a state of a sub-SLM unit corresponding to the input port 2 into OAM-2, and modulates sub-SLM units corresponding to the input port 1, the input port 3, and the input port 4 into a state of OAM-(−4). The optical signal incident from the input port 2 is modulated into an OAM-3 mode, and optical signals incident from other input ports are modulated into an OAM-(−3) mode. These optical signals are focused on the OAM demultiplexer 131 by using the converging lens 160, and then the OAM demultiplexer 131 transmits the optical signal of the OAM-3 mode to the output port to output the optical signal from the output port.

It should be understood that, for an M×N optical switching apparatus, for example, an 8×6 optical switching apparatus, in this embodiment of the present invention, some or all of eight inputs and six outputs may be used, for example, 6×6, 4×3, 2×5, 4×1, and 1×6, which is not limited in this embodiment of the present invention.

Therefore, the optical switching apparatus provided in this embodiment of the present invention implements optical signal switching based on an OAM technology; is applicable to a WDM network or an OAM network and simple in a structure; when applied to H×1 switching, modulates, into an OAM mode of an output port, an optical signal that finally needs to be output so as to implement optical signal switching; and has a low requirement for environmental stability.

Figure 5:
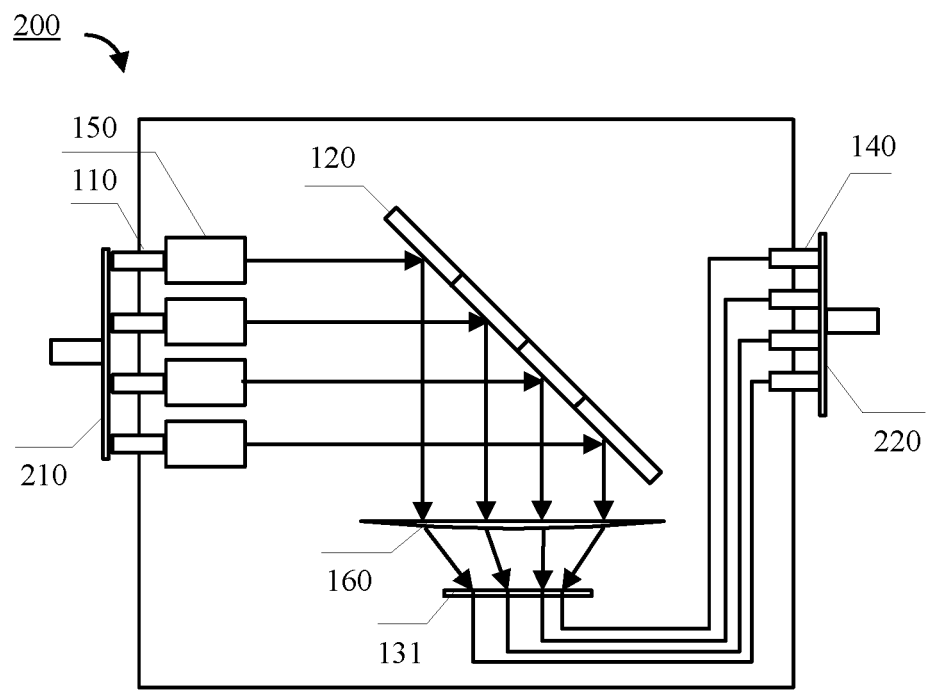
FIG. 5 is a schematic block diagram of an optical cross-connect node according to an embodiment of the present invention.

In another aspect, as shown in FIG. 5, an embodiment of the present invention provides an optical cross-connect node 200. The optical cross-connect node 200 includes: at least one optical switching apparatus 100 according to an embodiment of the present invention, at least one demultiplexer 210, and at least one multiplexer 220.

The demultiplexer is configured to demultiplex a received optical signal, so that demultiplexed optical signals are input to J input ports of N input ports of the optical switching apparatus, where N and J are positive integers, and J is less than or equal to N.

The multiplexer 220 is configured to multiplex optical signals output from K output ports of M output ports of the optical switching apparatus, where M and K are positive integers, and K is less than or equal to M.

It should be understood that features, structures, functions, and the like of some or all of components of the optical switching apparatus according to this embodiment of the present invention are identical with or similar to features, structures, and functions of corresponding components of the optical switching apparatus 100 in the embodiments shown in FIG. 1 to FIG. 4 in the present invention. Therefore, for brevity, details are not described herein.

Figure 6:
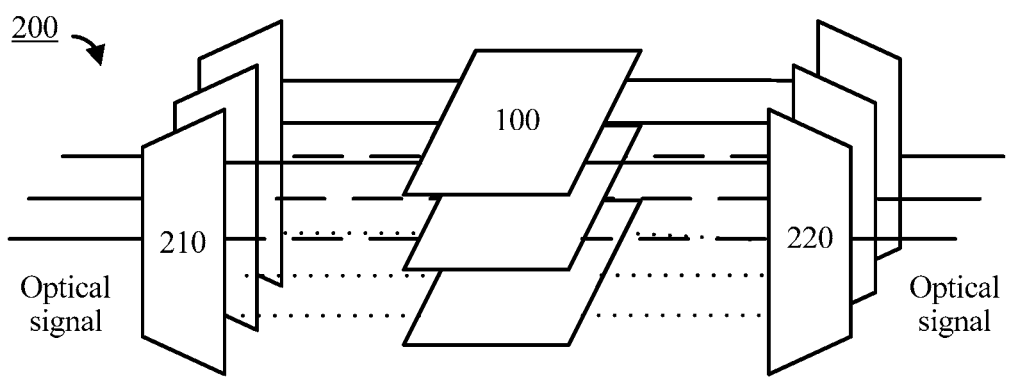
FIG. 6 is a schematic block diagram of an optical cross-connect node according to an embodiment of the present invention.

As shown in FIG. 6, a typical OXC node includes N input optical fibers, N 1×M demultiplexers, M N×N optical switching apparatuses, N M×1 multiplexers, and N output optical fibers, where an OAM splitter in the M N×N optical switching apparatuses is an OAM demultiplexer, and an optical signal output by the OAM demultiplexer is an optical signal without an OAM mode.

Optionally, in this embodiment of the present invention, the optical cross-connect node is applied to a wavelength division multiplexing WDM network, the demultiplexer 210 is a WDM demultiplexer, and the multiplexer 220 is a WDM multiplexer. An optical signal output from an output port of the optical switching apparatus is an optical signal without an OAM mode, and the WDM multiplexer performs wavelength division multiplexing on the optical signal.

Optionally, in this embodiment of the present invention, the optical cross-connect node is applied to an orbital angular momentum OAM network, the demultiplexer 210 is an OAM demultiplexer, and the multiplexer 220 is an OAM multiplexer. An optical signal output from an output port of the optical switching apparatus is an optical signal without an OAM mode, and the OAM multiplexer re-performs OAM multiplexing on the optical signal, that is, adds an appropriate OAM mode to the optical signal.

In addition, for the OXC node applied to the OAM network, if the OAM splitter in the optical switching apparatus included in the OXC node restores the optical signal into an OAM mode before modulation by an SLM, the optical signal output by the optical switching apparatus may not need to pass through the OAM multiplexer any more, and can be directly transmitted in an optical network. A specific implementation method is similar to the foregoing description, and details are not described herein.

Therefore, according to the optical cross-connect node in this embodiment of the present invention, an optical switching apparatus included in the optical cross-connect node is designed to implement optical signal switching based on an OAM technology, which is applicable to a WDM network or an OAM network, simple in a structure, and free from a congestion problem, and has a low requirement for environmental stability.

Figure 7:
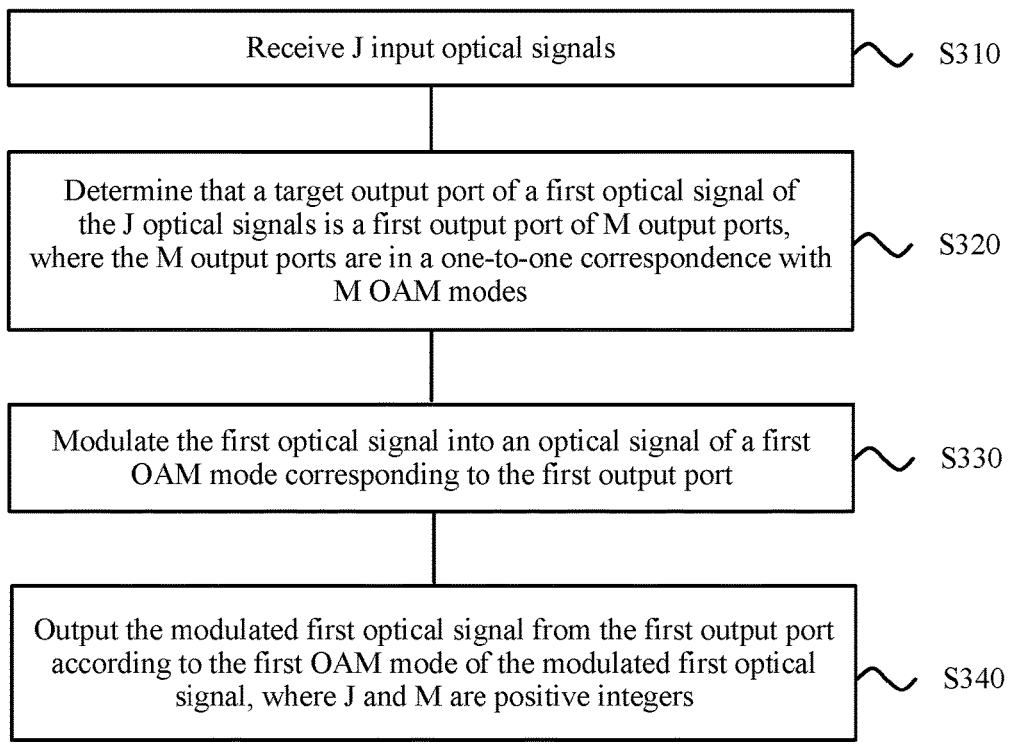
FIG. 7 is a schematic flowchart of an optical signal switching method according to an embodiment of the present invention.

FIG. 7 shows an optical signal switching method 300 according to an embodiment of the present invention. The method 300 may be correspondingly performed by an optical switching apparatus 100 in an embodiment of the present invention, and the method 300 includes the following steps:

S310: Receive J input optical signals. S310 may be received by J input ports of N input ports of the optical switching apparatus 100 in this embodiment of the present invention, where J is less than or equal to N.

S320: Determine that a target output port of a first optical signal of the J optical signals is a first output port of M output ports, where the M output ports are in a one-to-one correspondence with M OAM modes. S320 may be performed by a control unit, integrated in an OAM modulator, of the optical switching apparatus 100 in this embodiment of the present invention, or may be performed by a separate control component. Specifically, when N OAM modulators include N SLMs, S320 may be performed by an SLM control unit integrated in the SLM or a separate SLM control unit.

S330: Modulate the first optical signal into an optical signal of a first OAM mode corresponding to the first output port. S330 may be performed by a first OAM modulator of the N OAM modulators of the optical switching apparatus 100 in this embodiment of the present invention. Preferably, the SLM may modulate the first optical signal.

S340: Output the modulated first optical signal from the first output port according to the first OAM mode of the modulated first optical signal, where J and M are positive integers. S330 may be performed by an OAM splitter of the optical switching apparatus 100 in this embodiment of the present invention and the first output port of the M output ports connected to the OAM splitter.

Therefore, according to the optical signal switching method in this embodiment of the present invention, an appropriate OAM mode is added to an optical signal for which switching processing needs to be performed, and according to the OAM mode of the optical signal, optical signals with different OAM modes are switched to and output from corresponding target output ports.

Specifically, collimation and beam expansion may be performed on the J input optical signals, so that the optical signals form parallel light and can propagate farther in free space. After being switched to the free space, the J optical signals from different dimensions are incident in parallel on an OAM modulation component of the optical switching apparatus. According to routing information of an optical cross-connect node, that is, information about which output port each optical signal finally needs to be switched to, the OAM modulation component changes a modulation pattern of the OAM modulation component, for example, each one of J SLMs, and separately modulates the J parallel incident optical signals into corresponding OAM modes.

When more than one optical signal needs to be output, to avoid mutual interference between optical signals, it may be ensured that OAM modes of any two optical signals that need to be output are different from each other. When a quantity of input optical signals is greater than a quantity of output optical signals, an optical signal that finally needs to be output may be modulated into an optical signal of an OAM mode corresponding to an output port, while another optical signal that does not need to be output may be modulated into an optical signal of another OAM mode whose order is equal to that of the OAM mode of the optical signal that finally needs to be output and whose sign is opposite to that of the OAM mode of the optical signal that finally needs to be output, or may be modulated into an optical signal of another OAM mode different from the OAM mode of the optical signal that finally needs to be output.

Specifically, for one optical signal that needs to be output, for example, the first optical signal, the target output port of the first optical signal is the first output port of the M output ports. The first optical signal is modulated into the optical signal of the first OAM mode corresponding to the first output port. Then the first optical signal is transmitted to the first output port by using the OAM splitter.

Optionally, in an embodiment, when J≥2, and a second optical signal of the J optical signals has no target output port, the method further includes:

modulating the second optical signal into an optical signal of a second OAM mode different from an OAM mode corresponding to any one of the M output ports; and the outputting the modulated first optical signal from the first output port according to the first OAM mode of the modulated first optical signal includes:

according to OAM modes of modulated J optical signals, splitting the first optical signal from another optical signal having a different OAM mode from the first optical signal, and transmitting the first optical signal to the first output port.

Optionally, in an embodiment, when J≥2, M=1 and the M=1 output port is the first output port, a third optical signal of the J optical signals has no target output port, and the method further includes:

modulating the third optical signal into an optical signal of a third OAM mode whose order is equal to that of an OAM mode corresponding to the M=1 output port and whose sign is opposite to that of the OAM mode corresponding to the M=1 output port; and the outputting the modulated first optical signal from the first output port according to the first OAM mode of the modulated first optical signal includes:

according to OAM modes of modulated J optical signals, splitting the first optical signal from another optical signal having a different OAM mode from the first optical signal, and transmitting the first optical signal to the M=1 output port.

Therefore, according to the optical signal switching method in this embodiment of the present invention, an appropriate OAM mode is added to an optical signal for which switching processing needs to be performed, and the optical signal is switched to and output from a corresponding output port by means of OAM mode demultiplexing.

It should be understood that, in the embodiments of the present invention, sequence numbers of the foregoing processes do not mean execution sequences, whereas the execution order of the processes should be determined according to functions and internal logic of the processes, and should not be construed as any limitation on the implementation processes in the embodiments of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that, in the embodiments of the present invention, "B corresponding to A" indicates that B is associated with A, and B may be determined according to A. However, it should further be understood that determining A according to B does not mean that B is determined according to A only, that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, a network device, or the like) to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any equivalent modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An optical switching apparatus comprising:
    N input ports;
    N orbital angular momentum (OAM) modulators in a one-to-one correspondence with the N input ports;
    an OAM splitter;
    M output ports connected to the OAM splitter, wherein N and M are positive integers, the M output ports are in a one-to-one correspondence with M OAM modes, a first input port of the N input ports is configured to input a first optical signal, and a target output port of the first optical signal is a first output port of the M output ports;
    a first OAM modulator of the N OAM modulators and corresponding to the first input port is configured to modulate the first optical signal into an optical signal of a first OAM mode corresponding to the first output port, wherein the first optical signal is input from the first input port;
    the OAM splitter is configured to transmit the first optical signal to the first output port according to the first OAM mode of the first optical signal modulated by the first OAM modulator, wherein the first optical signal is received from the first OAM modulator; and
    the first output port of the M output ports is configured to output the first optical signal transmitted by the OAM splitter.

2. The optical switching apparatus according to claim 1, wherein the OAM splitter comprises an OAM demultiplexer, and
    the OAM demultiplexer is configured to demultiplex an optical signal according to an OAM mode of the optical signal modulated by the N OAM modulators, and transmit the first optical signal in the demultiplexed optical signal to the first output port.

3. The optical switching apparatus according to claim 2, wherein the optical switching apparatus further comprises a converging lens, and the converging lens is configured to converge the optical signal modulated by the N OAM modulators on a focus; and
    the OAM demultiplexer is located at the focus, and is configured to demultiplex the converged optical signal modulated by the N OAM modulators, and transmit the first optical signal in the demultiplexed optical signal to the first output port.

4. The optical switching apparatus according to claim 1, wherein the N OAM modulators comprise N spatial light modulators (SLMs).

5. The optical switching apparatus according to claim 1, wherein when N≥2, a second input port of the N input ports is configured to input a second optical signal, and the second optical signal has no target output port;
    a second OAM modulator that is of the N OAM modulators and is corresponding to the second input port is configured to modulate the second optical signal into an optical signal of a second OAM mode different from an OAM mode corresponding to any one of the M output ports, wherein the second optical signal is input from the second input port; and
    the OAM splitter is configured to: according to the OAM mode of the optical signal modulated by the N OAM modulators, split the first optical signal from another optical signal having a different OAM mode from the first optical signal, and transmit the first optical signal to the first output port.

6. The optical switching apparatus according to claim 1, wherein when N≥2, M=1, and the M=1 output port is the first output port, a third input port of the N input ports is configured to input a third optical signal, and the third optical signal has no target output port; wherein
- a third OAM modulator that is of the N OAM modulators and is corresponding to the third input port is configured to modulate the third optical signal into an optical signal of a third OAM mode whose order is equal to that of an OAM mode corresponding to the M=1 output port and whose sign is opposite to that of the OAM mode corresponding to the M=1 output port, wherein the third optical signal is input from the third input port; and
- the OAM splitter is configured to: according to the OAM mode of the optical signal modulated by the N OAM modulators, split the first optical signal from another optical signal having a different OAM mode from the first optical signal, and transmit the first optical signal to the first output port.

7. An optical cross-connect node comprising at least one optical switching apparatus, at least one demultiplexer, and at least one multiplexer, wherein
the optical switching apparatus comprises N input ports, N orbital angular momentum (OAM) modulators in a one-to-one correspondence with the N input ports, an OAM splitter, and M output ports connected to the OAM splitter,
- wherein N and M are positive integers, the M output ports are in a one-to-one correspondence with M OAM modes, a first input port of the N input ports is configured to input a first optical signal, and a target output port of the first optical signal is a first output port of the M output ports;
- a) a first OAM modulator that is of the N OAM modulators and is corresponding to the first input port is configured to modulate the first optical signal into an optical signal of a first OAM mode corresponding to the first output port, wherein the first optical signal is input from the first input port;
- b) the OAM splitter is configured to transmit the first optical signal to the first output port according to the first OAM mode of the first optical signal modulated by the first OAM modulator, wherein the first optical signal is received from the first OAM modulator; and
- c) the first output port of the M output ports is configured to output the first optical signal transmitted by the OAM splitter;
- the demultiplexer is configured to demultiplex a received optical signal, so that demultiplexed optical signals are input to J input ports of the N input ports of the optical switching apparatus, wherein J is positive integer, and J is less than or equal to N; and
- the multiplexer is configured to multiplex optical signals output from K output ports of the M output ports of the optical switching apparatus, wherein K is positive integer, and K is less than or equal to M.

8. The optical cross-connect node according to claim 7, wherein the optical cross-connect node is applied to a wavelength division multiplexing (WDM) network, the demultiplexer is a WDM demultiplexer, and the multiplexer is a WDM multiplexer.

9. The optical cross-connect node according to claim 7, wherein the optical cross-connect node is applied to an OAM network, the demultiplexer is an OAM demultiplexer, and the multiplexer is an OAM multiplexer.

10. An optical signal switching method comprising:
receiving J input optical signals;
determining that a target output port of a first optical signal of the J optical signals is a first output port of M output ports, wherein the M output ports are in a one-to-one correspondence with M orbital angular momentum (OAM) modes;
modulating the first optical signal into an optical signal of a first OAM mode associated with the first output port, wherein the first optical signal is input from a first input port of N input ports;
transmitting the first optical signal to the first output port according to the first OAM mode of the first optical signal modulated by a first OAM modulator associated with the first input port, wherein the modulated first optical signal is received from the first OAM modulator; and
outputting the modulated first optical signal from the first output port according to the first OAM mode of the modulated first optical signal, wherein J, N and M are positive integers.

11. The method according to claim 10, wherein when J≥2, and a second optical signal of the J optical signals has no target output port, the method further comprises:
modulating the second optical signal into an optical signal of a second OAM mode different from an OAM mode corresponding to any one of the M output ports; and
the outputting the modulated first optical signal from the first output port according to the first OAM mode of the modulated first optical signal comprises:
according to OAM modes of modulated J optical signals, splitting the first optical signal from another optical signal having a different OAM mode from the first optical signal, and transmitting the first optical signal to the first output port.

12. The method according to claim 10, wherein when J≥2, M=1, and the M=1 output port is the first output port, a third optical signal of the J optical signals has no target output port, and the method further comprises:
modulating the third optical signal into an optical signal of a third OAM mode whose order is equal to that of an OAM mode corresponding to the M=1 output port and whose sign is opposite to that of the OAM mode corresponding to the M=1 output port; and
the outputting the modulated first optical signal from the first output port according to the first OAM mode of the modulated first optical signal comprises:
according to OAM modes of modulated J optical signals, splitting the first optical signal from another optical signal having a different OAM mode from the first optical signal, and transmitting the first optical signal to the M=1 output port.

13. The method according to claim 10, further comprising:
demultiplexing an optical signal according to an OAM mode of the optical signal modulated by N OAM modulators, and
transmitting the first optical signal in the demultiplexed optical signal to the first output port.

14. The method according to claim 13, further comprising:
- converging the optical signal modulated by the N OAM modulators on a focus;
- demultiplexing the converged optical signal modulated by the N OAM modulators; and
- transmitting the first optical signal in the demultiplexed optical signal to the first output port.

* * * * *